United States Patent [19]

DeRees

[11] Patent Number: 4,726,166
[45] Date of Patent: Feb. 23, 1988

[54] VEHICLE FRAME RAIL ASSEMBLY AND UNDERBODY CONSTRUCTION

[75] Inventor: Delbert D. DeRees, Romeo, Mich.

[73] Assignee: American Motors Corporation, Southfield, Mich.

[21] Appl. No.: 839,799

[22] Filed: Mar. 14, 1986

[51] Int. Cl.⁴ .............................................. E04C 3/30
[52] U.S. Cl. ........................................ 52/694; 52/696; 52/730
[58] Field of Search ............... 52/694, 696, 729, 730, 52/731

[56] References Cited

U.S. PATENT DOCUMENTS

| | | |
|---|---|---|
| D. 230,265 | 2/1974 | Ollman . |
| 2,007,898 | 7/1935 | Ragsdale ........................ 52/731 X |
| 3,000,650 | 9/1961 | Burrows ........................ 280/106 |
| 3,073,647 | 1/1963 | Beltz ............................. 296/28 |
| 3,103,262 | 9/1963 | Handley . |
| 3,110,518 | 11/1963 | Wessels, III . |
| 3,170,198 | 2/1965 | Snider . |
| 3,362,056 | 1/1968 | Preller et al. ................. 52/729 X |
| 3,638,748 | 2/1972 | Tixler et al. . |
| 3,940,162 | 2/1976 | Winslow et al. ............... 52/694 X |
| 4,030,256 | 6/1977 | Ollman ......................... 52/90 |
| 4,057,263 | 11/1977 | Schwuchow et al. ......... 280/106 |
| 4,068,884 | 1/1978 | Watanabe et al. ............. 296/28 |
| 4,291,515 | 9/1981 | Harding ......................... 52/694 |
| 4,292,782 | 10/1981 | Schaeffer ...................... 52/696 |
| 4,342,470 | 8/1982 | Matsuda ........................ 280/785 |
| 4,450,926 | 5/1984 | Suzuki ........................... 180/312 |
| 4,493,506 | 1/1985 | Alexander ..................... 296/209 |
| 4,506,908 | 3/1985 | Harle ............................. 286/677 |
| 4,509,790 | 4/1985 | Nagamoto et al. ............ 296/204 |

FOREIGN PATENT DOCUMENTS

| | | | |
|---|---|---|---|
| 641585 | 4/1964 | Belgium ........................ 52/696 |
| 0009975 | 4/1980 | European Pat. Off. . |
| 863252 | 1/1953 | Fed. Rep. of Germany ... 52/729 |
| 0063798 | 4/1982 | Fed. Rep. of Germany . |
| 1353612 | 1/1964 | France ........................... 52/729 |
| 202761 | 8/1923 | United Kingdom ........... 52/731 |
| 1011093 | 11/1965 | United Kingdom ........... 52/696 |
| 1011092 | 11/1965 | United Kingdom . |
| 1314422 | 4/1973 | United Kingdom . |

*Primary Examiner*—Carl D. Friedman
*Attorney, Agent, or Firm*—Brooks & Kushman

[57] ABSTRACT

A rail assembly which is especially advantageous for use in constructing the frame and underbody of a motor vehicle comprises an upper channel member, a lower channel member and an intermediate member or web in the form of a corrugated sheet secured between the channel members and whose margins abuttingly engage the peripheral walls of the channels. Each furrow and ridge preferably comprises a planar panel portion.

37 Claims, 15 Drawing Figures

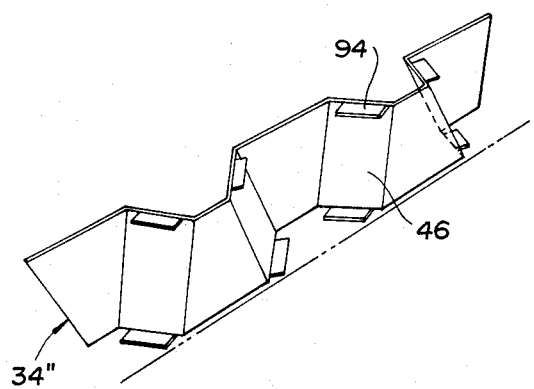
Fig. 6
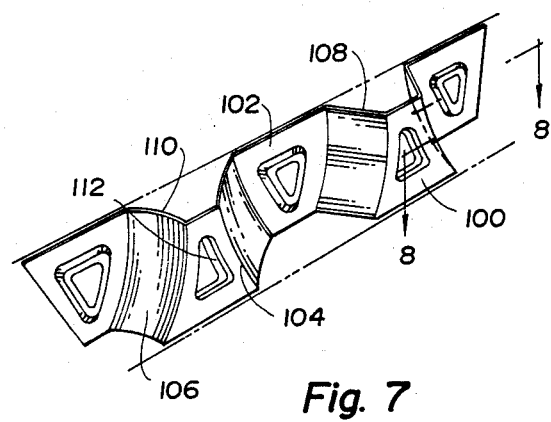
Fig. 7
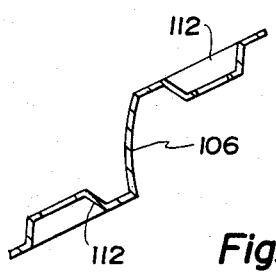
Fig. 8
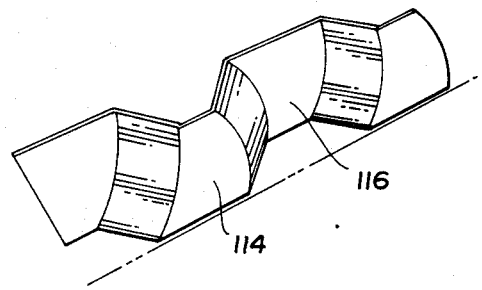
Fig. 9
Fig. 10
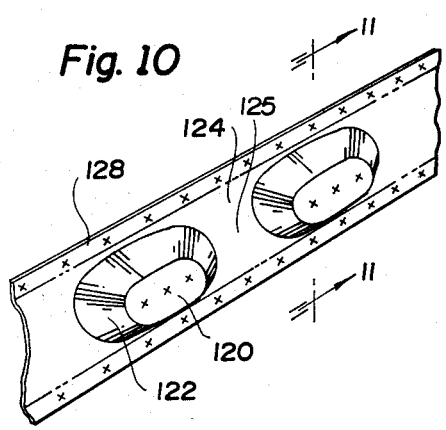
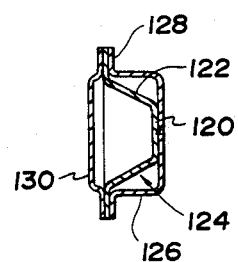
Fig. 11

VEHICLE FRAME RAIL ASSEMBLY AND UNDERBODY CONSTRUCTION

BACKGROUND OF THE INVENTION

I. Field of the Present Invention

The present invention relates generally to structural support rails, and more particularly, to a novel, elongated beam having an internal web and a high strength-to-weight ratio which is especially advantageous for incorporation in the construction of a motor vehicle underbody.

II. Description of the Prior Art

Previously known motor vehicle chassis constructions include a frame which is often constructed of longitudinal rails. Such rails are often connected by cross braces or the like to form a rigid structure for supporting the running gear, such as the axles, wheels, suspensions and brakes, the drive train including the engine and transmission and any transfer case or differential housing, and a separate vehicle body, including passenger compartment components. Such rails must be substantially rigid so as to avoid deformation and bending during operation of the motor vehicle. As a result, it has been known to form the rails from tubular or channel members to provide a high strength per unit area of rail. Unfortunately, such rails often have thick walls, which while adding strength to the frame, are weighty structures which when combined with the cross rails, running gear, drive train and body result in a heavy vehicle structure. As a result, performance characteristics and fuel economy of the motor vehicle can be substantially impaired by having to carry heavy structure and/or components.

One previously known means for reducing the vehicle weight has been to incorporate body panels or an entire body structure as a reinforcing member for the basic frame rails. While such construction reduces the number of parts used in constructing the vehicle and thus reduces the weight of the finished vehicle, such a construction can be substantially more complicated and difficult. For example, it can be difficult to properly assemble the suspension and drive train components in proper alignment unless the frame and body components are fully assembled so that they can provide proper support for the aligned components. Nevertheless, complete assembly of the body and frame rails can complicate the installation of the various components by substantially reducing access to mounting locations for various parts, and requiring complicated manipulation of welding heads, tools and the like to assemble the vehicle. Thus, it becomes extremely difficult to automate the assembly of the vehicle.

In addition, concern for the capability and durability of a motor vehicle has prompted an increase in the thickness or size of materials used in constructing various portions of the vehicle, and particularly, the structure defining the passenger compartment of the vehicle. However, merely increasing the thickness or dimensions of the components used to construct the vehicle works against the interest of reducing weight and fuel consumption, conserving fuel resources and improving performance of the vehicle. Furthermore, the use of exotic, strong but lightweight materials, such as synthetic or natural composite materials are often unduly expensive for use in the mass production of vehicles.

SUMMARY OF THE PRESENT INVENTION

The present invention provides a lightweight but sturdy rail construction in which upper and lower elongated members are secured to an intermediate corrugated web panel. At least one of the upper and lower members defines a channel adapted to entrain at least a portion of the corrugated sheet therein. The rail structure of the present invention is especially advantageous for use in constructing the frame rails or other components of a vehicle underbody in a novel manner, and also permits a novel construction of a protected passenger area in conjunction with a mass production vehicle underbody. Of course, it is to be understood that the rail structure can also be used in the construction of other vehicles, or structures such as buildings, machines and the like.

The frame rail of the preferred embodiment of the present invention comprises upper and lower channel members, each channel member having a base and substantially perpendicular side flanges extending from opposite sides thereof. The substantially U-shaped channels formed by each upper and lower member face each other and are interconnected by an elongated corrugated sheet extending substantially perpendicular to the base of each member. The alternating ridges and furrows of the corrugated sheet engage, and preferably are secured to, the flanges of the upper and lower members. Preferably, each furrow and ridge comprises a planar, trapezoidal panel, and each furrow is connected to the adjacent ridge by a planar web panel angled acutely with respect to the transverse axis that is perpendicular to the longitudinal axis of the rail.

However, other advantageous constructions of the web and the channel members are equally within the scope of the present inventions and will also be discussed in detail. For example, the introduction of curvature to the surfaces of the intermediate sheet increases the strength and resistance to uncontrolled deformation under various loads. In addition, variations of the number, size and spacing between the ridges and furrows within the same rail can be useful in meeting the load bearing requirements along the length of the rail, and permit the rail to be configured or vary in size throughout its length without sacrificing strength.

A frame rail constructed in accordance with the present invention is especially advantageous for use in forming a novel underbody construction in which strength and rigidity of the frame is also provided by a passenger flooring section constructed of sheet metal panels. In the preferred embodiment, the frame rails are sandwiched between an upper panel member and a lower panel member secured together outwardly of the rails. Peripheral portions of the flooring section include mating channel sections which form hollow beams or reinforced ledges. In the preferred embodiment, a transverse, step ledge follows a drive housing recess, while rocker panels are integrally formed with the upper and lower panels by mating flange portions which form a hollow beam. A cowl section also made of panels including channel forming configurations which mate to form hollow structural beams also includes a step ledge adapted to correspond with the step ledge formed at the front of the flooring section to provide additional reinforcement of the vehicle frame as well a reinforcement for the passenger compartment of the vehicle. The step ledges comprise substantially planar surfaces intersecting at an angle with respect to each other which form abutting alignment and bonding surfaces between the cowl section and the flooring section.

A further novel feature of the vehicle construction is provided by an arch-shaped pillar, hereinafter referred to as a pillar arch, positioned at the rear of the passenger compartment and utilizing a variation of the rail construction used to construct the frame rail of the preferred embodiment of the present invention. Preferably, the top of the rear portion of the rocker panel, formed by the particularly configured channel members incorporated with the upper and lower floor panels, includes a stepped section that mates with a step configuration at the lower ends of the legs of the pillar arch to mount the pillar arch to the flooring section. In addition, the top of the pillar arch can be secured with respect to the front cowl section by means of a cross bar to add further ridigity the passenger compartment defined therebetween and the underbody construction as a whole.

Thus, the present invention provides a novel rail construction which is lightweight, and which resists deflection along its length and torsional deformation, but which is easier to construct and can be made of lighter components than previously known thick-walled tubular or open "c" rails. In addition, the shape of the frame rail web can be used to absorb energy and deform in a controlled manner when subjected to excessive forces. Furthermore, the gauge of the material used to construct the rail can be varied, as it is possible to provide a desired strength and rigidity with a minimum of material by varying the pitch and the shape of the ridges and furrows. Moreover, the rails can be more easily formed with desired contours and varying cross sectional areas than previously known rail structures. Moreover, even though the gauge, shape and crossectional shape of a rail can be varied throughout its length, the number, size and spacing between the ridges can be varied and controlled to maintain a desired strength along the entire rail structure.

In addition, the present invention provides an underbody construction which is rigid enough to permit assembly of the drive train, running gear and other components in proper alignment regardless of the body style or configuration to be used with the chassis and prior to assembly of the body on the chassis. Moreover, the novel vehicle construction of the preferred embodiment provides a rigid frame structure which is substantially lighter in weight for a given level of strength than previously known frame constructions. In addition, the underbody construction of the preferred embodiment provides a rigid passenger compartment that provides additional rigidity and strength to the chassis frame, but does not restrict the configuration or style of body components to be used in enclosing the front, passenger or rear areas of the vehicle.

BRIEF DESCRIPTION OF THE DRAWING

The present invention will be more clearly understood by reference to the following detailed description of the preferred embodiment when read in conjunction with the accompanying drawing in which like reference characters refer to like parts throughout the views and in which:

FIG. 6 is an enlarged perspective view of a modification of the rail web constructed in accordance with the present invention;

FIG. 7 is an enlarged perspective view of a further modification of the rail web constructed in accordance with the present invention;

FIG. 8 is a sectional view taken substantially along line 8—8 in FIG. 7;

FIG. 9 is an enlarged perspective view similar to FIGS. 6 and 7 but showing a further modification of the rail web;

FIG. 10 is an enlarged perspective view showing a further modification of a rail web;

FIG. 11 is an enlarged view of a modified frame rail incorporating the rail web structure of FIG. 10, and taken substantially along the line 11—11 in FIG. 10;

DETAILED DESCRIPTION OF A PREFERRED EMBODIMENT OF THE PRESENT INVENTION

Figure 1:
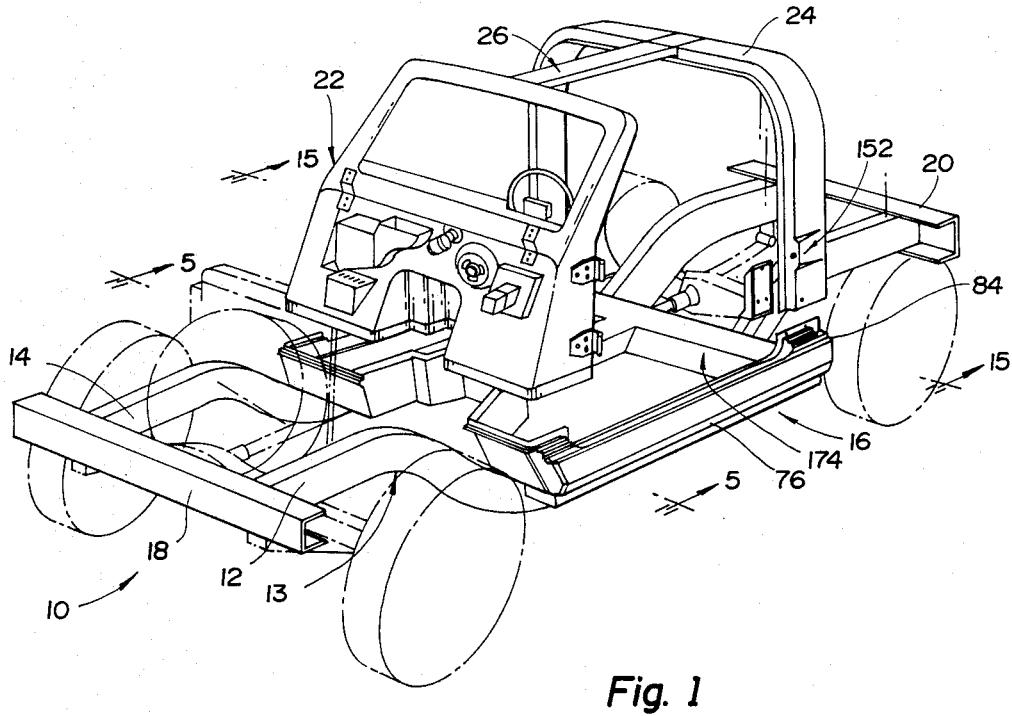
FIG. 1 is a perspective view of a vehicle underbody construction including a frame rail structure of the present invention.

Referring first to FIG. 1, a vehicle underbody 10 according to the present invention is thereshown comprising a pair of frame rails 12 and 14 and a flooring structure 16. In addition, a pair of end rails in the form of channel members 18 and 20 are secured to the longitudinal ends of the rails 12 and 14. The flooring structure 16 is adapted to support a cowl section 22 at the forward portion of the flooring section 16, and a pillar arch 24 at the rear of the floor section 16. A cross bar 26 extending from the top of the cowl section 22 to the top of the pillar arch 24 is secured at its ends to the cowl and pillar arch, respectively. These ends are secured by bonds such as welds, mechanical bonding, adhesive bonding, a combination of these bonds, or other bonding means and it is to be understood that the terms bond or bonding are to be construed broadly throughout this application so as not be be limited to only one form of securing means. Similarly, the cowl 22 and the roll bar section 24 can be bonded to the front and rear, respectively, of the flooring section 16 in a like manner. Additional details of the preferred construction and interconnection of the parts will be discussed in greater detail hereinafter.

Figure 2:
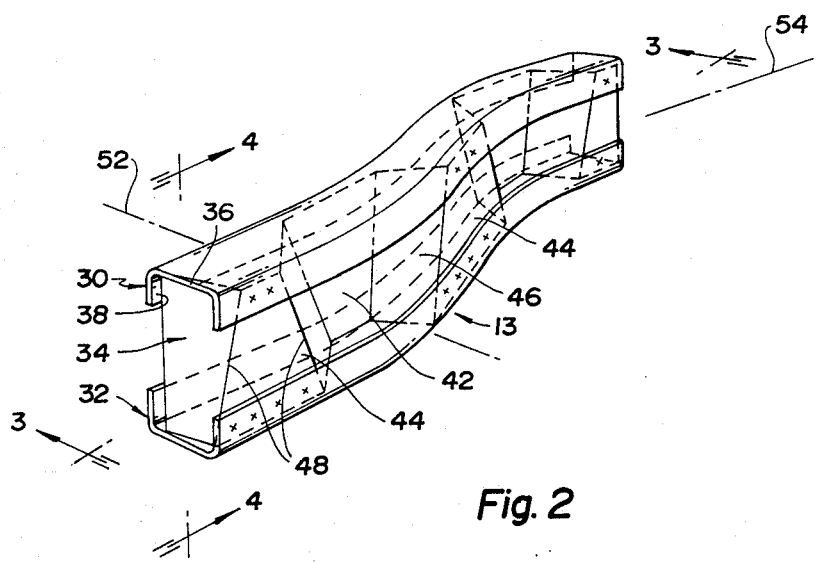
FIG. 2 is an enlarged perspective view of a frame rail constructed in accordance with the present invention.

Referring now to FIG. 2, a typical section of the frame rails 12 and 14 is represented by a perspective view of a portion of the frame rail 12. Since each of the frame rails 12 and 14 is of substantially the same construction, only one rail need be discussed in detail for the sake of brevity.

As shown in FIG. 2, the frame rail 12 comprises an upper member 30, a lower member 32 and an intermediate panel in the form of a corrugated sheet 34. Each of the upper and lower members 30 and 32 include a base 36 and a pair of side flanges 38 extending substantially perpendicular to the base 36.

Figure 3:
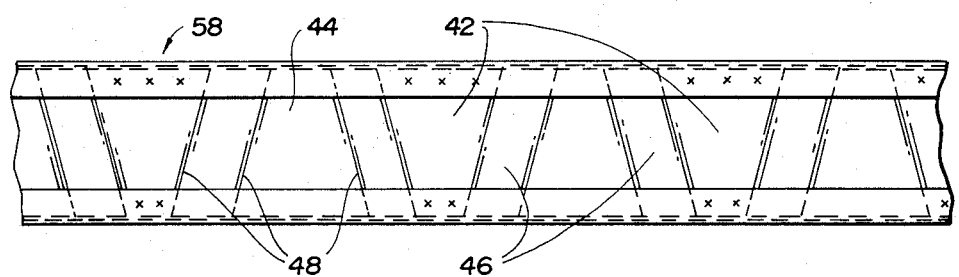
FIG. 3 is an enlarged side view of a portion of the frame rail shown in FIGS. 1 and 2.

As shown in FIGS. 2 and 3, the corrugated sheet 34 includes alternating furrows 42 and ridges 44 extending substantially perpendicular to the base of each channel member 30 and 32. Preferably, each furrow 42 and ridge 44 comprises a planar panel portion interconnected by a planar web panel portion 46. Preferably, as shown in FIG. 2, each planar panel portion 44 and 42 has a trapezoidal shape so that the edges or fold lines 48 are angled with respect to the vertical axis 50. Moreover, each of the web panel portions 46 is acutely angled with respect to the axis 52 transverse to the longitudinal axis 54 of the rail 12 as shown at 56. Such an intermediate panel can be easily stamped from an elongated metal sheet. Moreover, by adjusting the alignment of the fold lines 48 formed in the sheet, the intermediate panel can be formed with a curved configuration corresponding to curvatures formed in the upper and lower panels as indicated at 13 in FIGS. 1 and 2.

Figure 4:
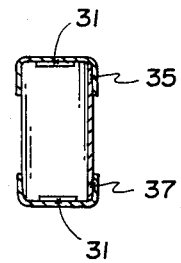
FIG. 4 is a sectional view taken substantially along the line 4—4 in FIG. 2.

As a result, it will be understood that the corrugated web provides structural rigidity against deflection in the direction of arrow 58 shown in FIG. 3 and against torsional deformation about the longitudinal axis of the rail, regardless of the exact shape of the frame rail. Thus, in a frame construction having spaced apart rails as shown in FIG. 1, the frame is adapted to support a large load and resist deformation under the forces exerted on the frame when the vehicle is driven. Structural integrity of the rail can be assued by welding or otherwise bonding each of the planar furrows and ridges against the corresponding flanges 38 as shown at 37 in FIG. 4, in addition to bonding the upper and lower longitudinal edges of the intermediate panel, such as the edges of the planar portions 46, to the base 36 of the upper and lower members 30 and 32 as shown at 31.

Figure 14:
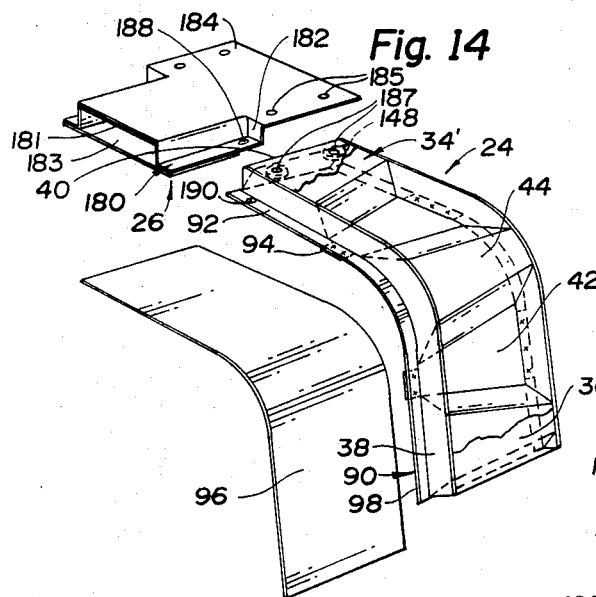
FIG. 14 is an enlarged, partially exploded, perspective view of a modification of the rail structure applied to components of the underbody construction shown in FIG. 1.

A variation of the enchanneled web construction used to construct the frame rail 12 is shown incorporated in the construction of the pillar arch 24 of the vehicle body 10 constructed in accordance with the present invention. As shown in FIG. 14, the pillar arch 24 comprises a channel member 90 having a hat-shaped cross section. The member 90 includes a base 36 and parallel side flanges 38 forming a channel adapted to receive the corrugated web 34'. The member 90 also includes side flanges 92 extending outwardly from the side flanges 38, and substantially parallel to the base 36.

The web 34' is made of folded sheet material in substantially the same manner as the web 34 shown in FIG. 2, and includes trapezoidally shaped planar ridges 44 and substantially planar furrows 42. However, unlike the web 34 shown in FIG. 2, the web 34' in the pillar arch 24 is laid into the channel on its side so that the longitudinal edges of the web 34' engage the side flanges 38 and at least a portion of each planar ridge panel 44 rests against the base 36. In addition, each planar furrow panel 42 includes lateral extensions 94 which overlap the side flanges 92 and can be bonded to the flanges.

In the preferred embodiment as shown in FIG. 14, a substantially flat cover sheet 96 can be laid over the joined web 34' and channel member 90 to form a smooth inner surface on the pillar arch 24. The side flanges 92 can also include raised portions 98 intermediate the portions of the flanges 92 overlapped by the lateral extensions 94, or alternatively depressions beneath the lateral extensions 94, to permit more continuous bonding between the cover plate 98 and the channel member 90.

Additional variations in the construction of a rail according to the present invention are shown in FIGS. 6–13. In FIG. 6, the web 34 includes auxiliary welding tabs 94 in the form of lateral extensions which are formed integrally with the planar web panels 46 rather than the planar furrows or ridges of the sheet 34.

As shown in FIG. 7, an intermediate panel or web constructed in accordance with the present invention can include non-planar surfaces. As shown in FIGS. 7 and 9, simple or compound curvatures can be stamped or drawn into the sheet to provide additional rigidity to the web and thus to the rail structure in which it is incorporated. As shown in FIG. 7, substantially planar ridge panels 100 and furrow panels 102 can be formed with curved edges 104 by stamping the web panels 106 in a curved shape. The stamped web 106 can be simply curved within a single plane, whereby only the edges 104 of the web panel are curved and the web 106 has linear edges as shown at 108, or compoundly curved as represented by the curved line edge as shown at 110.

In addition, FIG. 7 also discloses flanged and embossed access holes 112 in each of the ridge panels 100 and furrow panels 102. The access holes 112 permit bonding, welding or the like to be applied to otherwise inaccessible locations of the sheet and can be used for aeration to avoid entrapment of corrosive materials within a finished rail structure. In addition, the flanges and embossments further restrict uncontrolled deformation of the planar structures which can often occur under excessive load conditions.

In FIG. 9, ridges 114 and furrows 116 are also formed by curved panels which can be either simply or compoundly curved. Although such a structure may require that the sheet 34 be drawn during stamping rather than merely stamped and folded as in the embodiment shown in FIG. 2. When the sheet is made of metal, it should be understood that the web or intermediate panel might also be simply formed by molding synthetic material or the like depending on the particular load applications to which the rail structure is to be applied. Moreover, although it may be more difficult to bond such curved surfaces to the enclosing channel members, it may also be appreciated that the inherent strength provided by a sheet having compoundly curved, intersecting surfaces can minimize the need for bonding the sheet to the enclosing channel members at numerous points, especially when the dimensions or shape of the rail vary along its length and when the margins of the intermediate panel abuttingly engage the side flanges 38 and base 36 of the channel members.

In FIG. 10, the sheet 124 is shown including alternate furrows and ridges formed by a series of drawn depressions formed in the sheet by a planar punch. Such a process forms planar ridge panels 120 connected by compoundly curved web panels 122 with adjacent furrow panels 125. Such an intermediate sheet is well adapted to be received within, a hat-section shaped channel member such as 126 shown in FIG. 11. An advantageous lightweight rail construction can be formed by enclosing the web within the channel member 126 by sandwiching the longitudinal edges 128 of the sheet 124 between the outwardly extending flanges on the narrower hat-section channel member 130 and the channel member 126. Of course, these elements can be bonded together as desired.

Figure 12:
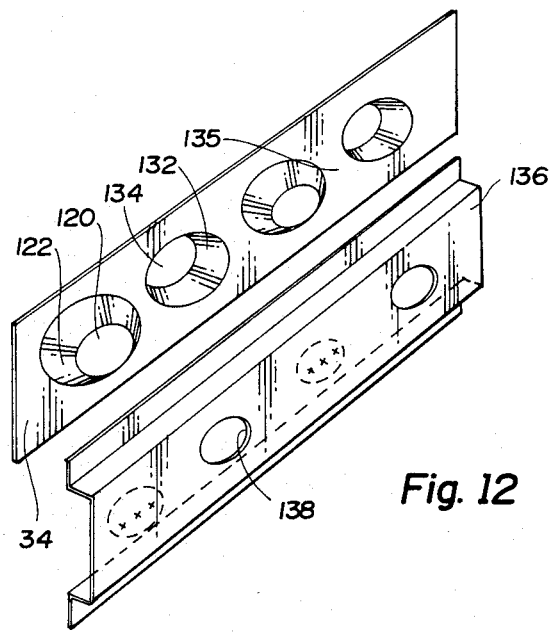
FIG. 12 is an exploded perspective view of a further modification of a rail constructed in accordance with the present invention.
Figure 13:
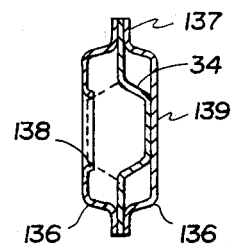
FIG. 13 is a sectional view of a rail incorporating the structures of FIG. 12.

Alternatively, the drawn depressions can be alternately oriented as shown in FIG. 12. Thus, both the ridge panels 120 and the furrow panels 134 include planar surface portions which can be bonded to adjacent surfaces of an enclosing channel member. In addition, a compoundly curved connection web 132 connects the planar furrow 134 with an intermediate web portion 135 of the sheet. Such a sheet 124 can be entrained between substantially similar hat-channel members 136 (FIG. 13), each of which has a set of flanged access holes 138 positioned to register with the facing depressions forming either the set of ridge panels 120 or the set of furrow panels 134, respectively. Such a structure can be readily bonded together along the mating flanges at 137 and the abutting surfaces at 139, although the type and number of bonds between the parts can be varied as desired.

Although a number of different variations of the rail structure have been discussed individually, it should be appreciated that several variations may be incorporated in a single intermediate sheet or web to provide desired strength characteristics along the length of a rail. Moreover, the crossectional area of the rail may vary along its length, and the size, number and spacing between the alternating furrows and ridges can be varied within a single intermediate panel to accommodate spacing considerations and load requirement along the length of a rail. Moreover, while the abutting engagement of the margins of the intermediate panel or web with the channel forming members is aided by bonding of the abutting surfaces, the rigidity of the composite rail can also be supplemented by filling the cavities between the alternating furrows and ridges with a rigid filler material.

For example, a lightweight, synthetic foam which can be injected or poured and subsequently hardened is particularly well adapted for maintaining the relative positions of the web, upper and lower members in their relative positions, and thus, maintaining the strength of the rail under load.

Figure 5:
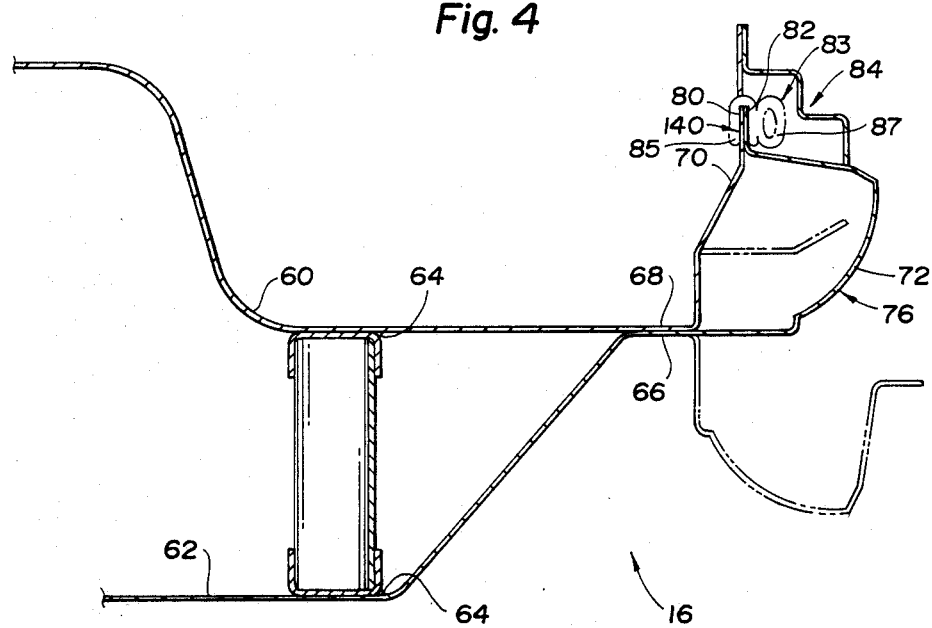
FIG. 5 is a sectional view of the underbody construction shown in FIG. 1 and taken substantially along line 5—5 in FIG. 1.

Referring now to FIG. 5, a portion of the flooring structure 16 is thereshown comprising an upper floor panel 60 and a lower floor panel 62. A frame rail 12 is sandwiched therebetween and welded or otherwise bonded or secured in place as shown at 64. The lower panel 62 includes an upwardly inclined portion extending laterally outwardly of the frame rail 12 so that a portion 66 of the lower panel 62 abuts against a laterally extending portion 68 of the upper panel 60 and can be bonded thereto.

The upper panel 60 also includes an end portion 70 rising upwardly above the lower panel portion 66 adapted to mate with an upwardly extending portion 72 of the lower panel 62. The panel portion 72 has a substantially convex shape so that the panel portions 70 and 72 form a hollow chamber 74 therebetween and together define a rocker panel 76. Both the panel portion 70 of upper panel 60 and panel portion 72 of lower panel 62 include upwardly extending mating flanges 80 and 82, respectively, that can be bonded together. However, without limitation of the type of fastening used, the flanges 80 and 82 form a structure hereinafter referred to as a pinch-weld flange 140. Such a flange is well adapted to receive an elongated seal member 83 as shown in phantom line in FIG. 5, which has a flange receiving channel 85 and a resilient seal body 87 positioned for sealing engagement with a body panel such as a door. Additional pinch-weld flanges can be formed on adjacent members such as the pillar arch in alignment with the flange 140.

In the preferred embodiment, each panel 60 and 62 is stamped to form a panel shaped in the manner shown in phantom line in FIG. 5. Thereafter, the end portions 70 and 72 are displaced to the positions shown in solid line in FIG. 5.

Figure 15:
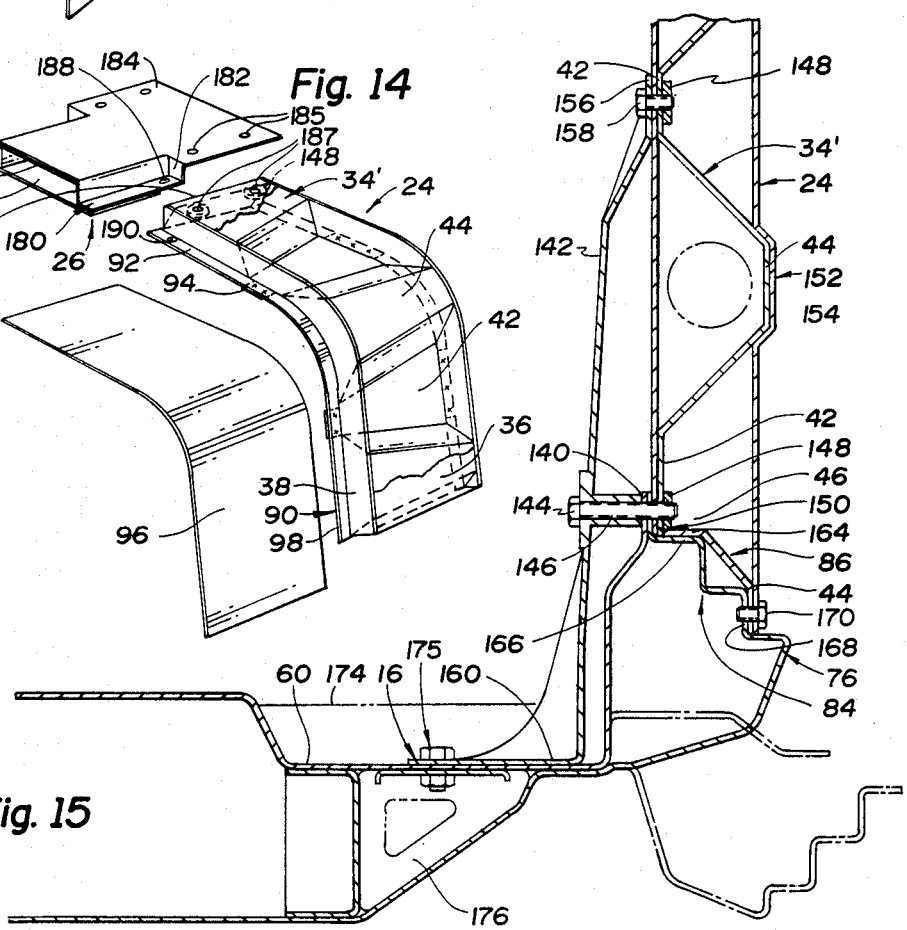
FIG. 15 is an enlarged sectional view taken substantially along line 15—15 in FIG. 1.

Referring now to FIG. 15, a further sectional view of the underbody construction illustrates how the rail structure of the present invention can be employed to advantage in securing the pillar arch 24 to the flooring platform 16. The pillar arch 24 is supported by a step portion 84 of the rocker panel 76 as well as an inner support member 142. All three members are joined together at the pinch-weld flange 140 by a bolt 144 extending through registering bores in a boss 146 in the inner support member 142, the pinch-weld flange 140, the cover member 96 of the pillar arch 24 and the web 34'. The bolt 144 is engaged within a weld nut 148 secured within a weld nut protrusion 150 formed in the web 34'. Of course, the weld nut protrusion can be stamped in the web 34' at the same time that the furrows and ridges are stamped in the web. Moreover, while the protrusion 150 provides an extension of the furrow panel 42, it also provides a curvature in the adjacent web panel 46.

In addition, the inner member 142 is secured to the pillar arch 24 at a position substantially above pinch-weld flange 140. In particular, the upper mounting point is positioned above a portion of the pillar arch 24 adapted to receive a striker pin for use in latching a door panel in a closed position. As illustrated in the drawing, striking pin area 152 is laterally expanded to provide a wide surface area diagrammatically indicated at 154 which permits adjustment of the striker pin within its mounting aperture in a well known manner. Nevertheless, the change in lateral dimension of the pillar arch at the striker pin area 152 is easily accommodated by both the web 34' and the hat section channel member 90 during stamping of each of these members.

In any event, the stamped inner support member 142 includes a mounting flange 156 having an aperture which registers with apertures in the inner member 96 of the pillar arch and in the furrow panel 42, and a bolt 158 extending through the registering apertures is engaged within a weld nut 148 mounted to the furrow panel 42. Additional support is provided by a foot portion 160 of the support member 142 which engages and can be bonded to the upper surface of the upper floor panel 60. Moreover, the mating edges of the inner support member 142 are configured to conform with the shape of the upwardly extending flange 70 of upper panel 60 and the portion of the pillar arch 24 intermediate the mounting flange 156 and the pinch-weld flange 140 as shown by the hidden line at 162.

Additional support for the pillar arch is also provided by the interengagement of the stepped portions 86 and 84 of the pillar arch 24 and the rocker panel 76, respectively. The rear portion of the rocker panel 72 includes a step configuration, as shown at 84 in FIGS. 1, 5 and 15, adapted to mate with the stepped portion 86 at the end of the pillar arch 24 shown in FIG. 15. The step configuration 84 can be formed as an integral part of the panel portion 72. The protruding portion 150 formed in the web 34' not only defines an extension of the planar surface of the furrow panel 42 to which the weld nut 148 can be attached, but it also provides a substantially perpendicular surface 164 adapted to mate with a top step surface 166 on the rocker panel 76. Similarly, a ridge panel 44 adjacent to the panel 46 that includes the projection 150 is adapted to mate with a substantially vertical step portion 168, and additional fasteners such as the rivet 170 can extend through the mating step portion 168, the furrow panel 44 and the base of the hat-section member 90 of the pillar arch 24. Of course, other bonds can be utilized to secure these flanges together. Nevertheless, the mating engagement of the parts along these spaced apart surfaces angularly disposed with respect to each other results in rigid attachment and proper alignment of the pillar arch 24 with respect to the flooring platform 16. Although the pillar is referred to as being supported in a substantially upright position with respect to the flooring panels, it is to be understood that such a position includes inclined orientations of the pillar arch.

Additional strength can be provided to the underbody structure as desired. For example, as shown in phantom line at 174 in FIG. 15 and in solid line in FIG. 1, reinforcement beams can be rigidly secured across the flooring platform 16. Preferably, such beams are formed from stamped panels for ease of construction. Moreover, the rail structure of the present invention is well adapted for use in constructing such beams, especially when additional rigidity is required in an underbody which does not include a pillar arch or cowl module as in the preferred embodiment. Nevertheless, these beams, like the other beams referred to in this application as stamped beams, can also be formed or molded structures made of plastic, other synthetic materials or composites of various materials without departing from the scope of the invention. In addition, the passenger platform of the preferred embodiment includes additional local strengthening members such as the bulkhead 176 intermediate the upper and lower platform panels 60 and 62 and the rail 12 to provide additional reinforcement for the pillar arch 24. Moreover, the inner support member 142 can be bonded to the platform as shown by the reinforcement support members through which a mounting bolt is received as shown at 175.

Referring again to FIG. 14, additional strength and rigidity is provided by the interconnection of cross bar 26 with the pillar arch 24, and a similar connection between the cross bar 26 and the upper member of the windshield frame the cowl member 22 (not shown). As shown in FIG. 14, cross bar 26 includes a hat-section outer member 180 whose central portion receives a strengthening web 181 such as the web 34' in the pillar arch 24, and covered by a panel 183 similar to inner member 96. The lateral flanges of the hat-section member 180 include upturned portions 182 extending toward an expanded base portion 184. The expanded base portion 184 overlaps the base of the hat-section member 90 of the pillar arch 24 and includes apertures 185 registering with apertures 187 in the base of the hat-section and in the ridge panel 44. A weld nut 148 is secured to the ridge panel 44 beneath apertures 187 and adapted to receive a threaded fastener therein. A similar connection can be made through registering apertures 188 and 190 in he lateral flanges of the cross bar 26 and the pillar arch 24, respectively. Moreover, the mating engagement between the expanded base flange 184, the flange 182 and the lateral flange with corresponding surfaces on the pillar arch 24 provides alignment as well as additional bonding surfaces which can be bonded together as desired. In addition, additional alignment and bonding surfaces can be provided as shown in phantom line in FIG. 14.

Thus, the present invention provides a sturdy frame rail structure which can have substantially thinner wall section than previously known tubular or channel frame rails for similar strength characteristics. In addition, the cross section of the frame rail can be reduced from the size of previously known tube or channel type rails, and variations in the crossectional area or shape of the rail throughout its length are more easily produced since the components can be easily stamped, cut or modified as desired. Moreover, the frame rail construction is particularly well adapted for use in constructing a modular underbody construction in which components such as a pillar arch are used, or in modular vehicle sections in which rails are formed from mating channel configurations in sheet metal panels.

In addition to the advantages of the frame rail construction itself, it will be understood that the present invention provides an underbody incorporating a pillar arch, means for rigidly securing the pillar arch to a flooring structure for the underbody, a cowl structure adapted to be integrally secured to the flooring structure and a cross bar extending between the cowl structure and the pillar arch. Such a construction provides substantial strength and rigidity to the underbody, and the vehicle structure as a whole regardless of the particular type of frame rail used. Furthermore, the underbody defines a rigid cage about the vehicle passenger compartment regardless of the configuration or style of body panels to be used to cover the front, passenger and rear areas of the vehicle.

Thus, the underbody structure permits a complete and operable chassis to be constructed to receive a wide variety of body styles, body sections and passenger compartment trim without affecting the structural rigidity or integrity of the vehicle during production. Moreover, the underbody construction provides means for accurately aligning and interconnecting running gear, drive train, suspension and other components of the motor vehicle before the underbody is enclosed by body components. Nevertheless, the underbody includes large openings which provide access to mounting locations for vehicle components and thus, contribute to ease of assembly of the vehicle during production.

Having thus described the present invention, many modifications thereto will become apparent to those skilled in the art to which it pertains without departing from the scope and spirit of the present invention as defined in the appended claims.

What is claimed is:

1. A support rail comprising:
   an upper elongated member having a base with longitudinal edges,
   a lower elongated member having a base with longitudinal edges, and
   a web panel secured to and positioned between said upper and lower members, said web panel comprising an elongated sheet having alternating furrows and ridges extending in a direction perpendicular to the longitudinal axis of said panel,
   wherein at least one of said upper and lower members includes a pair of single walled side flanges, each side flange extending from an opposite longitudinal edge of said base to define a channel between said side flanges adapted to receive said web, wherein said furrows define a first margin of said web panel, wherein said ridges define a second margin of said web panel, wherein the longitudinal edges on opposite sides of said web panel sheet define third and fourth margins, respectively, and wherein each of at least three of said first, second, third and fourth margins abuttingly engage an adjacent one of said two side flanges and said base of said at least one member, and means for securing said web panel in said channel, and wherein said side flanges and said margins engaging said adjacent side flanges include at least linearly mating, overlapping engagement surface portions, and wherein one of said first and second margins abuttingly engages said base of said at least one of said upper and lower members, and wherein the other of said first and second margins includes web flanges extending laterally outwardly beyond said side flanges.

2. The invention as described in claim 1 wherein said ridges and furrows are formed by stamping said web panel to form furrow panel sections, ridge panel sections and web panel sections interconnecting said furrow sections and said ridge sections.

3. The invention as described in claim 2 wherein said stamping step comprises folding said web panel to form planar furrow panel sections, planar ridge panel sections and planar web panel sections.

4. The invention as described in claim 2 wherein at least one of said furrow panel sections, ridge panel sections and web panel sections include integrally formed means for reinforcing said at least one of said panel sections.

5. The invention as described in claim 4 wherein said reinforcement means comprises a curvature in at least one of said panel sections.

6. The invention as described in claim 5 wherein said curavture comprises a compound curvature.

7. The invention as described in claim 5 wherein said at least one of said panel sections comprises said web panel sections and wherein each of at least one of said ridge panel sections and said furrow panel sections comprise a planar panel.

8. The invention as described in claim 1 wherein each said furrow and ridge comprises a planar panel portion.

9. The invention as described in claim 8 wherein each said planar portion is trapezoidal.

10. The invention as described in claim 8 wherein each planar panel portion is coupled to an adjacent panel portion by a planar web portion.

11. The invention as described in claim 10 wherein each planar web portion is acutely angled with respect to the transverse axis perpendicular to the longitudinal axis of said support rail.

12. A support rail comprising:
an upper elongated member having a base with longitudinal edges,
a lower elongated member having a base with longitudinal edges, and
a web panel secured to and positioned between said upper and lower members, said web panel comprising an elongated sheet having alternating furrows and ridges extending in a direction perpendicular to the longitudinal axis of said panel,
wherein at least one of said upper and lower members includes a pair of side flanges, each side flange extending from an opposite longitudinal edge of said base to define a channel between said side flanges adapted to receive said web,
wherein said furrows define a first margin of said web panel, wherein said ridges define a second margin of said web panel, wherein the longitudinal edges on opposite side of said web panel sheet define third and fourth margins, respectively, and
wherein each of at least three of said first, second, third and fourth margins abuttingly engage an adjacent one of said two side flanges and said base of said at least one member, and
means for securing said web panel in said channel, and
wherein each furrow and ridge comprises a planar panel portion, and
wherein each said planar panel portion is trapezoidal.

13. The invention as described in claim 12 wherein the trapezoidal shape of each furrow panel is inverted with respect to the trapezoidal shape of each adjacent ridge panel.

14. The invention as described in claim 12 wherein said furrow panels and said ridge panels are secured to said side flanges of said at least one member.

15. A support rail comprising:
an upper elongated member having a base with longitudinal edges,
a lower elongated member having a base with longitudinal edges, and
a web panel secured to and positioned between said upper and lower members, said web panel comprising an elongated sheet having alternating furrows and ridges extending in a direction perpendicular to the longitudinal axis of said panel,
wherein at least one of said upper and lower members includes a pair of side flanges, each side flange extending from an opposite longitudinal edge of said base to define a channel between said side flanges adapted to receive said web,
wherein said furrows define a first margin of said web panel, wherein said ridges define a second margin of said web panel, wherein the longitudinal edges on opposite side of said web panel sheet define third and fourth margins, respectively, and
wherein each of at least three of said first, second, third and fourth margins abuttingly engage an adjacent one of said two side flanges and said base of said at least one member, and
means for securing said web panel in said channel,
wherein one of said first and second margins abuttingly engages said base of said at least one of said upper and lower members,
wherein the other of said first and second margins includes web flanges extending laterally outwardly beyond said side flanges, and
wherein said at least one of said upper and lower members has a hat cross section and includes edge flanges extending outwardly from said side flanges and wherein said web flanges abuttingly engage said edge flanges.

16. A support rail comprising:
an upper elongated member having a base with longitudinal edges,
a lower elongated member having a base with longitudinal edges, and
a web panel secured to and positioned between said upper and lower members, said web panel comprising an elongated sheet having alternating furrows and ridges extending in a direction perpendicular to the longitudinal axis of said panel, wherein at least one of said upper and lower members includes a pair of side flanges, each side flange extending from an opposite longitudinal edge of said base to define a channel between said side flanges adapted to receive said web, wherein said furrows define a first margin of said web panel, wherein said ridges define a second margin of said web panel, wherein the longitudinal edges on opposite side of said web panel sheet define third and fourth margins, respectively, and wherein each of at least three of said first, second, third and fourth margins abuttingly engage and adjacent one of said two side flanges and said base of said at least one member, and means for securing said web panel in said channel, wherein one of said first and second margins abuttingly engages said base of said at least one of said upper and lower members, wherein the other of said first and second margins includes web flanges extending laterally outwardly beyond said side flanges, wherein said at least one of said upper and lower members has a hat cross section and includes edge flanges extending outwardly from said side flanges, and wherein each of at least one of said alternating furrows and ridges is formed by depressions in said web panel sheet.

17. The invention as described in claim 16 wherein said depressions are spaced from the longitudinal edges of said sheet, whereby said web panel includes laterally extending longitudinal flanges.

18. The invention as described in claim 17 wherein each said longitudinal flange abuttingly engages an end of one of said two side flanges and matingly engages one of said edge flanges.

19. The invention as described in claim 18 wherein said means for securing comprises means for bonding each said longitudinal flange to its respective one edge flange.

20. The invention as described in claim 16 and wherein the other of said upper and lower members comprise a cover panel dimensioned to abuttingly engage said longitudinal flanges.

21. The invention as described in claim 20 wherein said cover member comprises a plurality of apertures, each aperture being positioned to register with one of said depressions.

22. The invention as defined in claim 16 wherein each said depression registers with an opening formed in one of said upper and lower elongated members.

23. A support rail comprising:

an upper elongated member having a base with longitudinal edges, a lower elongated member having a base with longitudinal edges, and a web panel secured to and positioned between said upper and lower members, said web panel comprising an elongated sheet having alternating furrows and ridges extending in a direction perpendicular to the longitudinal axis of said panel, wherein at least one of said upper and lower members includes a pair of side flanges, each side flange extending from an opposite longitudinal edge of said base to define a channel between said side flanges adapted to receive said web, wherein said furrows define a first margin of said web panel, wherein said ridges define a second margin of said web panel, wherein the longitudinal edges on opposite side of said web panel sheet define third and fourth margins, respectively, and wherein each of at least three of said first, second, third and fourth margins abuttingly engage an adjacent one of said two side flanges and said base of said at least one member, and means for securing said web panel in said channel, wherein said ridges and furrows are formed by stamping said web panel to form furrow panel sections, ridge panel sections and web panel sections interconnecting said furrow sections and said ridge sections, wherein at least one of said furrow panel sections, ridge panel sections and web panel sections include integrally formed means for reinforcing said at least one of said panel sections, wherein said reinforcement means comprises a curvature in at least one of said panel sections, and wherein at least one of said first and second margins engages one of said side flanges and said curvature has a radius of curvature lying in a second plane which is perpendicular to a first plane, said first plane containing the longitudinal axis of the rail and being parallel to said bases.

24. A support rail comprising:

an upper elongated member having a base with longitudinal edges, a lower elongated member having a base with longitudinal edges, and a web panel secured to and positioned between said upper and lower members, said web panel comprising an elongated sheet having alternating furrows and ridges extending in a direction perpendicular to the longitudinal axis of said panel, wherein at least one of said upper and lower members includes a pair of side flanges, each side flange extending from an opposite longitudinal edge of said base to define a channel between said side flanges adapted to receive said web, wherein said furrows define a first margin of said web panel, wherein said ridges define a second margin of said web panel, wherein the longitudinal edges on opposite side of said web panel sheet define third and fourth margins, respectively, and wherein each of at least three of said first, second, third and fourth margins abuttingly engage an adjacent one of said two side flanges and said base of said at least one member, and means for securing said web panel in said channel, wherein one of said first and second margins abuttingly engages said base of said at least one of said upper and lower members, wherein the other of said first and second margins includes web flanges extending laterally outwardly beyond said side flanges, wherein said ridges and furrows are formed by stamping said web panel to form furrow panel sections, ridge panel sections and web panel sections interconnecting said furrow sections and said ridge sections, wherein at least one of said furrow panel sections, ridge panel sections and web panel sections include integrally formed means for reinforcing said at least one of said panel sections, wherein said reinforcement means comprises a curvature in at least one of said panel sections, and said curvature having a radius of curvature lying in a second plane which is perpendicular to a first plane, said first plane containing the longitudinal axis of the rail and being perpendicular to said bases.

25. A support rail comprising:

an upper elongated member having a base with longitudinal edges, a lower elongated member having a base with longitudinal edges, and a web panel secured to and positioned between said upper and lower members, said web panel comprising an elongated sheet having alternating furrows and ridges extending in a direction perpendicular to the longitudinal axis of said panel, wherein at least one of said upper and lower members includes a pair of side flanges, each side flange extending from an opposite longitudinal edge of said base to define a channel between said side flanges adapted to receive said web, wherein said furrows define a first margin of said web panel, wherein said ridges define a second margin of said web panel, wherein the longitudinal edges on opposite side of said web panel sheet define third and fourth margins, respectively, and wherein each of at least three of said first, second, third and fourth margins abuttingly engage an adjacent one of said two side flanges and said base of said at least one member, and means for securing said web panel in said channel, and wherein one of said first and second margins includes web flanges extending laterally outwardly beyond said side flanges.

26. The invention as described in claim 25 wherein said at least one of said upper and lower elongated members has a hat cross section and includes edge flanges extending outwardly from said side flanges and wherein said web flanges abuttingly engage said edge flanges.

27. The invention as described in claim 26 and wherein said means for securing comprises means for bonding said web flanges to said edge flanges.

28. The invention as described in claim 25 wherein said at least one of said upper and lower members has a hat cross section and includes edge flanges extending outwardly from said side flanges.

29. The invention as described in claim 28 wherein each of at least one of said alternating furrows and ridges is formed by depressions in said web panel sheet.

30. A support rail comprising:

an upper elongated member having a base with longitudinal edges, a lower elongated member having a base with longitudinal edges, and a web panel secured to and positioned between said upper and lower members, said web panel comprising an elongated sheet having alternating furrows and ridges extending in a direction perpendicular to the longitudinal axis of said panel, wherein at least one of said upper and lower members includes a pair of side flanges, each side flange extending from an opposite longitudinal edge of said base to define a channel between said side flanges adapted to receive said web, wherein said furrows define a first margin of said web panel, wherein said ridges define a second margin of said web panel, wherein the longitudinal edges on opposite side of said web panel sheet define third and fourth margins, respectively, and wherein each of at least three of said first, second, third and fourth margins abuttingly engage an adjacent one of said two side flanges and said base of said at least one member, and means for securing said web panel in said channel, and wherein one of said first and second margins abuttingly engages said base of said at least one of said upper and lower members.

31. A support rail comprising:

an upper elongated member having a base with longitudinal edges, a lower elongated member having a base with longitudinal edges, and a web panel secured to and positioned between said upper and lower members, said web panel comprising an elongated sheet having alternating furrows and ridges extending in a direction perpendicular to the longitudinal axis of said panel, wherein at least one of said upper and lower members includes a pair of single walled side flanges, each side flange extending from an opposite longitudinal edge of said base to define a channel between said side flanges adapted to receive said web, wherein said furrows define a first margin of said web panel, wherein said ridges define a second margin of said web panel, wherein the longitudinal edges on opposite sides of said web panel sheet define third and fourth margins, respectively, and wherein each of at least three of said first, second, third and fourth margins abuttingly engage an adjacent one of said two side flanges and said base of said at least one member, and means for securing said web panel in said channel, and wherein said side flanges and said margins engaging said adjacent side flanges include at least linearly mating, overlapping engagement surface portions, and wherein said ridges and furrows are formed by stamping said web panel to form furrow panel sections, ridge panel sections and web panel sections interconnecting said furrow sections and said ridge sections, and wherein at least one of said furrow panel sections, ridge panel sections and web panel sections include integrally formed means for reinforcing said at least one of said panel sections, and wherein said reinforcement means comprises a curvature in at least one of said panel sections, and wherein said curvature comprises a compound curvature.

32. A support rail comprising:

an upper elongated member having a base with longitudinal edges, a lower elongated member having a base with longitudinal edges, and a web panel secured to and positioned between said upper and lower members, said web panel comprising an elongated sheet having alternating furrows and ridges extending in a direction perpendicular to the longitudinal axis of said panel, wherein at least one of said upper and lower members includes a pair of single walled side flanges, each side flange extending from an opposite longitudinal edge of said base to define a channel between said side flanges adapted to receive said web, wherein said furrows define a first margin of said web panel, wherein said ridges define a second margin of said web panel, wherein the longitudinal edges on opposite sides of said web panel sheet define third and fourth margins, respectively, and wherein each of at least three of said first, second, third and fourth margins abuttingly engage an adjacent one of said two side flanges and said base of said at least one member, and means for securing said web panel in said channel and wherein said side flanges and said margins engaging said adjacent side flanges include at least linearly mating, overlapping engagement surface portions, and wherein said ridges and furrows are formed by stamping said web panel to form furrow panel sections, ridge panel sections and web panel sections interconnecting said furrow sections and said ridge sections, and wherein at least one of said furrow panel sections, ridge panel sections and web panel sections include integrally formed means for reinforcing said at least one of said panel sections, and wherein said reinforcement means comprises a curvature in at least one of said panel sections, and wherein said at least one of said panel sections comprises said web panel sections and wherein each of at least one of said ridge panel sections and said furrow panel sections comprise a planar panel.

33. A support rail comprising:
an upper elongated member having a base with longitudinal edges,
a lower elongated member having a base with longitudinal edges, and
a web panel secured to and positioned between said upper and lower members, said web panel comprising an elongated sheet having alternating furrows and ridges extending in a direction perpendicular to the longitudinal axis of said panel,
wherein at least one of said upper and lower members includes a pair of single walled side flanges, each side flange extending from an opposite longitudinal edge of said base to define a channel between said side flanges adapted to receive said web,
wherein said furrows define a first margin of said web panel, wherein said ridges define a second margin of said web panel, wherein the longitudinal edges on opposite sides of said web panel sheet define third and fourth margins, respectively, and
wherein each of at least three of said first, second, third and fourth margins abuttingly engage an adjacent one of said two side flanges and said base of said at least one member, and
means for securing said web panel in said channel, and
wherein said side flanges and said margins engaging said adjacent side flanges include at least linearly mating, overlapping engagement surface portions, and
wherein each said furrow and ridge comprises a planar panel portion, and
wherein each said planar panel portion is trapezoidal.

34. The invention as described in claim 33 wherein each planar panel portion is coupled to an adjacent panel portion by a planar web panel, each planar web panel being acutely angled with respect to a transverse axis perpendicular to the longitudinal axis of said support rail.

35. The invention as described in claim 33 wherein the trapezoidal shape of each furrow panel is inverted with respect to the trapezoidal shape of each adjacent ridge panel.

36. A support rail comprising: an upper elongated member having a base with longitudinal edges,
a lower elongated member having a base with longitudinal edges, and
a web panel secured to and positioned between said upper and lower members, said web panel comprising an elongated sheet having alternating furrows and ridges extending in a direction perpendicular to the longitudinal axis of said panel,
wherein at least one of said upper and lower members includes a pair of single walled side flanges, each side flange extending from an opposite longitudinal edge of said base to define a channel between said side flanges adapted to receive said web,
wherein said furrows define a first margin of said web panel, wherein said ridges define a second margin of said web panel, wherein the longitudinal edges on opposite sides of said web panel sheet define third and fourth margins, respectively, and
wherein each of at least three of said first second, third and fourth margins abuttingly engage an adjacent one of said two side flanges and said base of said at least one member, and
means for securing said web panel in said channel, and
wherein said side flanges and said margins engaging said adjacent side flanges include at least linearly mating, overlapping engagement surface portions, and
wherein each said furrow and ridge comprises a planar panel portion, and
wherein each planar panel portion is coupled to an adjacent panel portion by a planar web portion, and
wherein each planar web portion is acutely angled with respect to the transverse axis perpendicular to the longitudinal axis of said support rail.

37. A support rail comprising:
an upper elongated member having a base with longitudinal edges,
a lower elongated member having a base with longitudinal edges, and
a web panel secured to and positioned between said upper and lower members, said web panel comprising an elongated sheet having alternating furrows and ridges extending in a direction perpendicular to the longitudinal axis of said panel.
wherein at least one of said upper and lower members includes a pair of single walled side flanges, each side flange extending from an opposite longitudinal edge of said base to define a channel between said side flanges adapted to receive said web,
wherein said furrows define a first margin of said web panel, wherein said ridges define a second margin of said web panel, wherein the longitudinal edges on opposite sides of said web panel sheet define third and fourth margins, respectively, and wherein each of at least three of said first, second, third and fourth margins abuttingly engage an adjacent one of said two side flanges and said base of said at least one member, and means for securing said web panel in said channel, and wherein said side flanges and said margins engaging said adjacent side flanges include at least linearly mating, overlapping engagement surface portions. and wherein said first margin abuttingly engages one of said two side flanges and said second margin abuttingly engages the other of said two side flanges.

wherein said furrow panels and said ridge panels are secured to said side flanges of said at least one member and wherein said furrow panels and said ridge panels are planar, trapezoidal panels.

* * * * *

UNITED STATES PATENT AND TRADEMARK OFFICE
CERTIFICATE OF CORRECTION

PATENT NO. : 4,726,166
DATED : February 23, 1988
INVENTOR(S) : Delbert D. DeRees It is certified that error appears in the above-identified patent and that said Letters Patent is hereby corrected as shown below:

| | |
|---|---|
| Column 3, Line 17 | "ridigity" should be --rigidity--. |
| Column 5, Line 32 | "assued" should be --assured--. |
| Column 6, Line 60 | After "within" delete --,--. |
| Column 9, Line 62 | "he" should be --the--. |
| Column 10, Line 5 | "section" should be --sections--. |
| Column 11, Line 40, Claim 6 | "curavture" (first occurrence) should be --curvature--. |
| Column 13, Line 14, Claim 16 | "and" (second occurrence) should be --an--. |
| Column 18, Line 30, Claim 36 | After "first" insert --,--. |

Signed and Sealed this

Fourth Day of October, 1988

*Attest:*

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,726,166

DATED : February 23, 1988

INVENTOR(S) : Delbert D. DeRees

It is certified that error appears in the above-identified patent and that said Letters Patent is hereby corrected as shown below:

IN THE CLAIMS:

Delete Claim 30 (Column 15, Line 54 through Column 16, Line 14).

Signed and Sealed this

Fifth Day of September, 1989

Attest:

DONALD J. QUIGG

*Attesting Officer*    *Commissioner of Patents and Trademarks*